United States Patent
Price

(10) Patent No.: US 6,738,932 B1
(45) Date of Patent: May 18, 2004

(54) METHOD AND SYSTEM FOR IDENTIFYING SOFTWARE REVISIONS FROM MEMORY IMAGES

(75) Inventor: Greg A. Price, Camberwell West (AU)

(73) Assignee: Sun Microsystems, Inc., Palo Alto, CA (US)

( * ) Notice: Subject to any disclaimer, the term of this patent is extended or adjusted under 35 U.S.C. 154(b) by 698 days.

(21) Appl. No.: 09/746,699

(22) Filed: Dec. 22, 2000

(51) Int. Cl.$^7$ ................................................. G06F 11/00
(52) U.S. Cl. ............................ 714/38; 714/45; 717/124
(58) Field of Search .............................. 714/37, 38, 40, 714/45; 717/122, 124, 128, 170

(56) References Cited

U.S. PATENT DOCUMENTS

| | | | |
|---|---|---|---|
| 5,111,384 A | 5/1992 | Aslanian et al. | 395/575 |
| 5,335,341 A | 8/1994 | Chana | 395/575 |
| 5,339,406 A | 8/1994 | Carney et al. | 395/575 |
| 5,452,442 A * | 9/1995 | Kephart | 714/38 |
| 5,499,365 A * | 3/1996 | Anderson et al. | 707/203 |
| 5,790,777 A | 8/1998 | Izuta et al. | 395/183.21 |
| 5,819,024 A | 10/1998 | Kasuga et al. | 395/183.02 |
| 5,940,513 A * | 8/1999 | Aucsmith et al. | 713/187 |
| 5,999,933 A | 12/1999 | Mehta | 707/100 |
| 6,158,024 A * | 12/2000 | Mandal | 714/37 |
| 6,490,695 B1 * | 12/2002 | Zagorski et al. | 714/38 |
| 6,658,659 B2 * | 12/2003 | Hiller et al. | 717/170 |

* cited by examiner

Primary Examiner—Robert Beausoliel
Assistant Examiner—Gabriel Chu
(74) Attorney, Agent, or Firm—Kent A. Lembke; William J. Kubida; Hogan & Hartson LLP

(57) ABSTRACT

A method for identifying software executing on a computer system from a memory image defining at a particular time a state of the executing software. The method includes populating a comparison file for the computer system with executable signatures. The executable signatures correspond to preselected executables that can be run on the computer system, such as kernel software, and include version identifying information. Executables are located in the received memory image and are then processed to generate comparison information. The comparison information is compared to the version identifying information to identify software. Executable text segments in the preselected executables are isolated, and offset, size, and checksum are determined for inclusion in the executable signature. The executable text segments in the memory image are isolated and a checksum determined. The checksum information is then compared to achieve matches and to accurately identify software versions running on the computer system.

17 Claims, 4 Drawing Sheets

METHOD AND SYSTEM FOR IDENTIFYING SOFTWARE REVISIONS FROM MEMORY IMAGES

BACKGROUND OF THE INVENTION

1. Field of the Invention

The present invention relates, in general, to systems and methods for determining at a particular operating time, e.g., at the time of a crash, the version of software executing on a computer system, and, more particularly, to a software identification system and method for use in dump analysis for identifying from a memory image which version of kernel or other software was running on a computer system at the time of a system crash.

2. Relevant Background

Computer system designers and analysts face the ongoing and often difficult task of determining why a computer system stopped operating or is failing to operate as designed. When a problem or error condition in the computer system is serious enough to stop or interrupt the execution of a running program, this failure is known as a crash. To assist in system analysis, a crash or memory dump is performed when a computer system crashes to generate a memory image of the existing state of software executing on the system at the time of the crash and of other system-related information. In this regard, the system-level commands or programs in the operating system, i.e., the kernel software, is of particular interest to system analysts in debugging a crashed computer system. For example, in an UNIX®-based system, the kernel is the program that contains the device drivers, the memory management routines, the scheduler, and system calls. Often, dump analysis begins with analysis of these executables. Dump analysis, which includes inspection of the memory image for the cause of the crash, is a difficult and time-consuming task due to the large quantity of information contained in the dumped memory image.

The task of identifying and correcting the cause of the problem in the currently running software is further complicated because the person or mechanism performing the dump analysis usually needs to first identify what version of kernel (or other) software was running on the computer system when the crash occurred and the memory image was created. In this regard, dump analysis often requires properly matching machine code or executables present in the crash memory image to the source code that created the machine code to identify programming problems and errors. This matching process can be a time-consuming and nearly impossible task without knowledge of the versions of software the computer system was running.

Typically, after a version of kernel or other software is installed in a computer system, updated versions and patches (i.e., small additions to the original software code to bypass or correct problems) become available from the software provider and are installed by the system operator. The installation of these updates and patches often are not recorded, such as by entering them into a software management system. Additionally, the system operator may modify the received software with or without the permission of the software provider and may fail to notify the software provider what modifications have been made to the system software. Consequently, there is a need for an effective way to identify the version of software running on a computer system, especially at the time of a system crash, to improve debugging and maintenance of system software.

While providing some useful version information, existing techniques of identifying the version of software running on a computer system do not effectively meet the need of computer system analysts. One technique involves inspecting the ondisk records created when the running software was installed, but this is only useful if software or package management applications were properly installed and used by the system operator during system configuration changes. Another identification technique involves comparing the crash memory image with a stored or ondisk file from which the running software was loaded into the computer system. Often, this stored file is not provided to the analyst as part of initial dump analysis and typically requires the system operator, who is a customer of the analyst and software provider, to take actions (such as software verification steps) to assist in the dump analysis. Clearly, it is desirable to avoid burdening a software customer with additional actions when their computer system has crashed due to a problem with the software provided by the analyst or their company. For this reason, it is also typically not desirable to try to identify software versions by requesting the system operator or customer to print a revision or patch list. Additionally, such a patch list may not be accurate because the software, e.g., kernel binary, may have been updated without recordation and/or the system software configuration may have changed from the crash configuration by the time the patch list is generated by the customer.

Hence, there remains a need for an improved method and system for identifying the version of software, such as kernel software, running on a computer system. To improve the effectiveness of dump analysis, such a method and system preferably would be configured to be useful for identifying versions of kernel software running on a computer system at the time of a computer system crash causing a memory dump (i.e., generating a crash memory image).

SUMMARY OF THE INVENTION

The present invention addresses the above discussed and additional problems by providing a software version identification system that effectively and efficiently isolates and then identifies software (e.g., executables) in a crash memory image to identify the versions of software running on a computer system. Generally, the identification system includes an indexing mechanism that operates to create a comparison file containing signature information for a set of executables that may be run on the computer system. The signature information includes a total size in bytes of each executable and includes offset and byte length information and a checksum for executable text segments (i.e., segments of the executable that are typically not altered during execution of the software) in the executable, and additional version identification information (e.g., version name, patches included, and the like). The identification system also includes an identification mechanism configured to process memory images from the computer system to determine the size in bytes of executables in the memory image. The identification system is further operable to index into the comparison file to find executables that have the same total size. Positive identification of software is achieved with the identification mechanism by comparing at each matching offset the lengths of executable text segments the signature information and for the executable in the memory image. Positive identification of software is achieved with the identification mechanism by comparing each checksum in a signature with checksums calculated from the memory image at the same offsets and lengths of executable text segments in the signature.

According to another important aspect of the invention, a method is provided for identifying software executing on a computer system from a memory image that defines at a particular time a state of the executing software. The software identifying method includes populating a comparison file for the computer system with executable signatures. The executable signatures correspond to a number of preselected executables that can be run on the computer system, such as specific portions of kernel software, and include for each preselected executable version identifying information. The method continues with locating executables in the received memory image. Next, the located executables are processed to generate comparison information for each of the located executables. To identify which of the preselected executables are operating on the computer system at the time the memory image was created, the method continues with comparing the comparison information to the version identifying information, with matches providing positive identification of software.

In a preferred embodiment of the method, the populating step includes isolating executable text segments in the preselected executables and determining an offset, a size, and a checksum for each isolated executable text segment. The offset, size, and checksum information is then included in the executable signature for use in the comparing step. In this regard, the processing of the located executables preferably includes steps for each signature in the comparison file where total size of executables is the same, such that for every checksum in a signature the offset and length associated with that checksum is used to generate a checksum from the memory image to compare with the checksum from the signature to indicate a match of the isolated segment. In this manner, the software operating on the computer system at the time the memory image was generated can be accurately and quickly identified.

DETAILED DESCRIPTION OF THE PREFERRED EMBODIMENTS

The present invention is illustrated and described in terms of the environment of a computer system, e.g., any electronic device executing software, that is communicatively linked to a dump analysis system. The dump analysis system is configured according to the invention to create, index, and maintain system comparison files from the software programs intended to be loaded and run on the computer system. The comparison files can be thought of as comprising unique signatures of the executable files (such as the modules of the kernel software) that can be used by the dump analysis system to effectively identify from a crash memory image which versions of the executable files were running on the computer system at the time of a system crash. A preferred embodiment of the invention is particularly useful for identifying the versions and revisions of kernel software that were running when the computer system crashed and created a crash memory image. However, as will be apparent to those skilled in the software arts, the indexing and identification features of the invention are more generally useful to identify versions of any type of software running on a computer system based on a memory image detailing a state of the software executing on the computer system.

Figure 1:
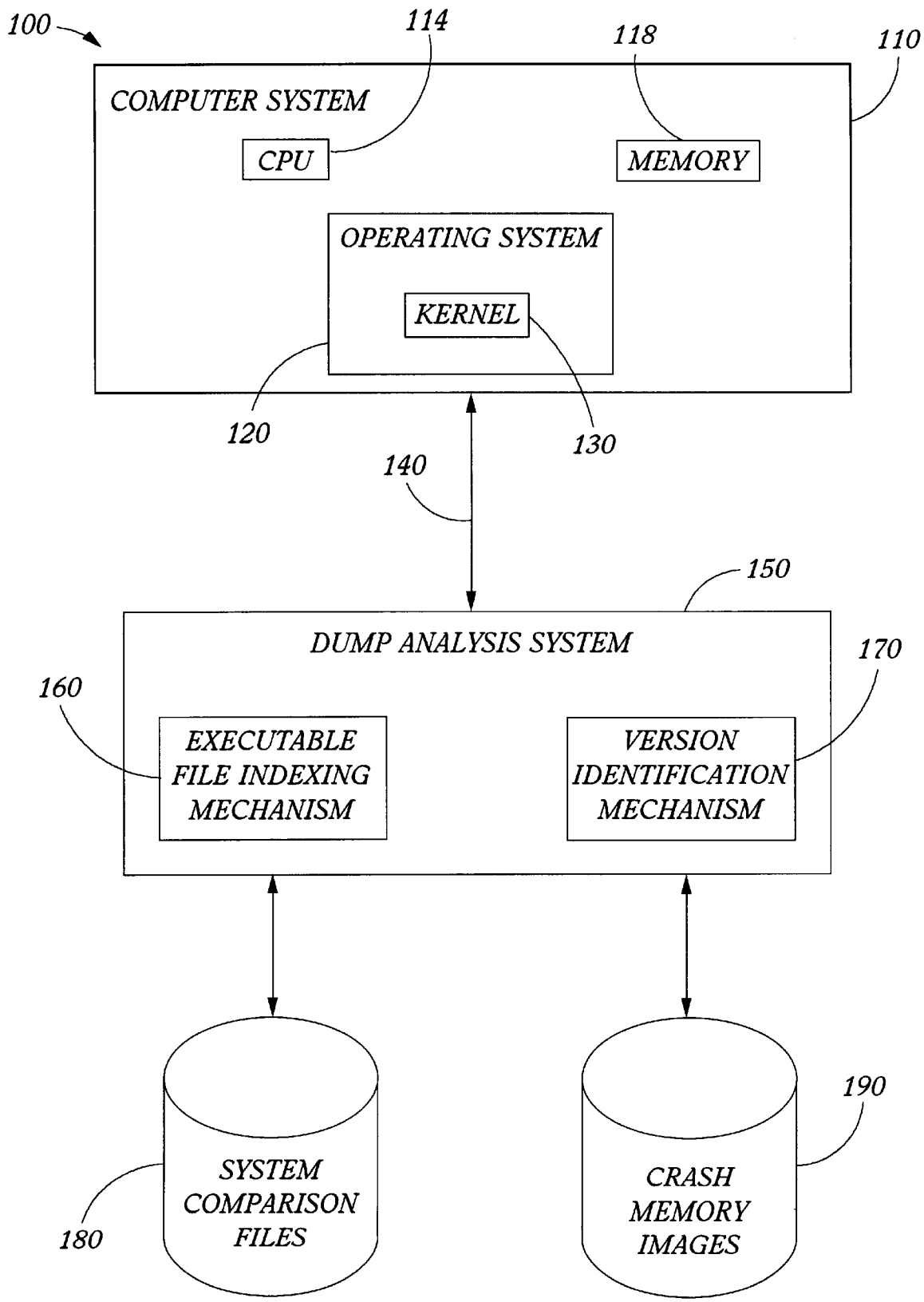
FIG. 1 illustrates a software version identification system with a dump analysis system for identifying software versions running on a computer system according to the present invention.

FIG. 1 illustrates a simplified embodiment of a software version identification system 100 configured to provide the software indexing and version identification functions of the invention useful for accurately determining versions of executing software. As illustrated, the identification system 100 includes a computer system 110 which may be any well-known type of computer system adapted for executing software programs and, in a preferred embodiment, adapted for creating a memory image providing byte sequence-type state information for the executing software (such as at the time of a system crash). To this end, the computer system 110 is shown to include a central processing unit (CPU) 114 for performing logic, computational, and decision-making functions, memory 118, and an operating system 120 (e.g., MS-DOS™, UNIX™, PICK™, and others) or program run by the CPU 114 to manage the operation of the computer system 110. Within the operating system 120 is a kernel 130 or kernel software which comprises the system-level commands (i.e., executables or executable files), such as device drivers, memory management routines, the scheduler, system calls, and the like. The kernel 130 is typically important to properly performing a dump analysis, and the kernel 130 is always running while the computer system 110 is operating.

According to a significant feature of the invention, the identification system 100 includes a dump analysis system 150 for identifying the versions of software executing on the computer system 110 (such as the versions of executables in the kernel 130) at a particular time of operation (e.g., at the time of a crash of computer system 110). The dump analysis system 150 may be a computer system similar to computer system 110 or may be a software application or object executing on a computer system (not shown) to monitor the computer system 110 and identify versions of executing software. A communication link 140 is provided to facilitate the transfer of information (such as a crash memory image and executable files, as will be discussed in detail) between the computer system 110 and the dump analysis system 150. The communication link 140 may be a wired or wireless link configured for digital communication and may include a data communication network such as the Internet. In an alternative embodiment, no communication link is included and files and other information are stored on memory (such as disk), which is later physically transferred to the dump analysis system 150. In a further embodiment, the dump analysis system 150 is included as an element of the computer system 110.

As illustrated in FIG. 1, the dump analysis system 150 includes an executable file indexing mechanism 160 and a version identification mechanism 170 for performing the indexing and version identification operations of the system 100. In this regard, the mechanisms 160, 170 may be software applications executing within the dump analysis system 150, and their operations are discussed more fully with reference to FIGS. 3 and 4, respectively. Briefly, during operation of the system 100, the executable file indexing mechanism 160 functions to identify select executables, such as executable 200 of FIG. 2, that may be loaded and run on the computer system 110 (such as part of the kernel 130). The identified executables are retrieved from the computer system 110, such as, but not necessarily, from memory 118, processed, indexed, and placed in storage as a file identified with or linked to the computer system 110 in the system comparison files 180 (e.g., a file storage device). It will be understood that the dump analysis system 150 may be used to monitor and analyze the operation of more than one computer system 110, and each comparison file in the files 180 preferably is clearly identified with a particular computer system 110.

When a crash occurs, the computer system 110 operates to generate a crash memory image that is transmitted for analysis to the dump analysis system 150 over link 140. The generated image is stored in the crash memory images 190 (e.g., a data file storage device). As will be discussed more fully, the version identification mechanism 170 then operates to process the crash memory image provided by the computer system 110 (or by other means) to identify the versions of software running at the time of the crash by comparing the crash memory image with the comparison file stored in the system comparison files 180. Once the versions of software are identified, dump analysis can be performed more efficiently to determine the cause of the system crash. Note, dump analysis, and hence, creation of a "crash" memory image, is commonly performed for system audit purposes even though a crash has not occurred, and the invention is equally useful for these non-crash purposes.

The operation of the identification system 100 will now be discussed in detail with reference to FIGS. 1–4. Generally, the operation of the identification system 100 can be thought of as involving the steps of indexing known software (e.g., software loaded or to be loaded on the computer system and of dump analysis interest, i.e., useful for debugging purposes) and, then, identifying which ones of the indexed software are present in a crash memory image received from the computer system 110.

Figure 3:
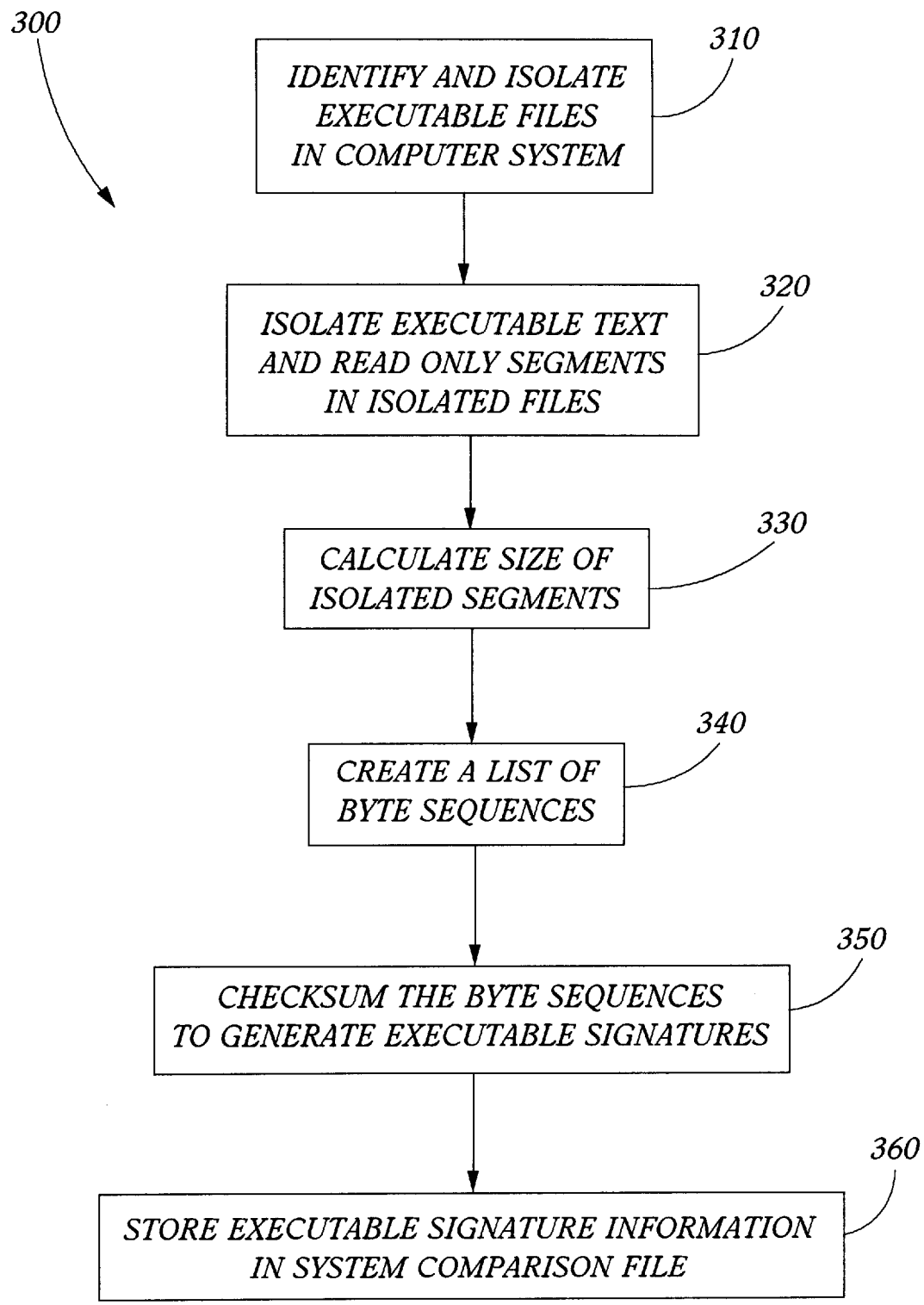
FIG. 3 is a flow diagram showing the operation of the executable file indexing mechanism of the dump analysis system of FIG. 1.

Referring first to FIG. 3, exemplary steps of an indexing process 300 according to the invention and, at least partially performed by the executable file indexing mechanism 160, are illustrated. The indexing process 300 is important for creating a comparison file (such as a database file) of software that may be executed on the computer system 110 for later use in identifying the versions of software actually executing on the computer system 110 when a crash occurred. An initial step 310 of the indexing process 300 is identifying and isolating executable files in the computer system 110 that will be useful in later dump analysis and for which version identification may be desirable. The identified and isolated executable files are then transferred to the dump analysis system 150 for further processing. Typically, these executable files will be present on the computer system 110, such as in memory 118, but may also be stored in separate software backup devices (e.g., disk and tape drives, disks, and the like).

In one preferred embodiment of step 310, identifying executable files to be included in the kernel 130 is stressed. In this embodiment, file identification involves identifying the different file formats used to distribute kernel software in the computer system 110. The executable files are then isolated by isolating the modules loadable by the kernel 130. In a more specific, but not limiting, example of this embodiment, the isolating portion of step 310 is completed by searching for files corresponding to a specific programming language (such as, for example, Logical Framework (LF), Standard ML, Elf, which is a uniform meta-language for specifying, implementing, and proving properties of programming languages and logics, and other programming languages) in kernel subdirectories of patch and package archives or other locations in memory 118.

Figure 2:
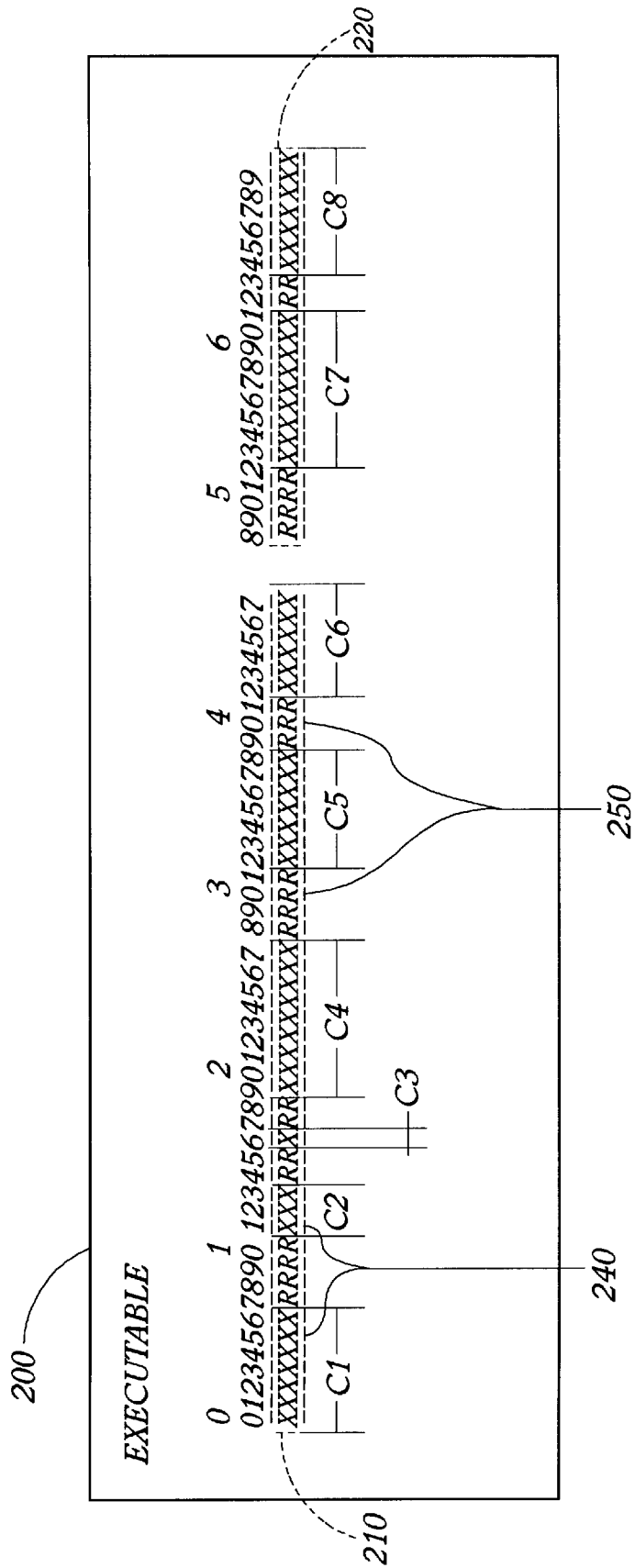
FIG. 2 illustrates an exemplary executable file that can be run on the computer system of FIG. 1 and used for comparison to executable modules in a crash memory image by the version identification mechanism of FIG. 1.

The indexing process 300 continues at 320 with using the indexing mechanism 160 to isolate the executable text and read only segments in each of the executable files retrieved in the previous step 310. FIG. 2 illustrates an exemplary executable 200 (i.e., a particular version (with or without patches and revisions) of a program that is ready to be run) that may be retrieved and further processed as part of the indexing process 300. As illustrated, the executable 200 is a sequence of bytes that are divided into two executable sections 210, 220. Initially, in step 320, the format of the executable 200 may have to be decoded to properly isolate the executable text and read only segments of the file 200, including any loader relocations associated with each segment. The "X" bytes represent bytes that are executable text and read only bytes that are not altered when loaded in computer system 110 and are grouped into executable segments 240. The "R" bytes represent bytes that will typically be altered by a kernel loader/linker when the executable 200 is being loaded and/or executed (see segments 250). The "C" labels indicate checksum values that are calculated for each of the executable segments 240.

In this regard, checksums are the number of bytes in the executable segments 240. As illustrated, the checksum values for executable 200 are C1=7, C2=3, C3=1, C4=9, C5=7, C6=6, C7=9, and C8=7. Significantly, these checksums will not change for the executable 200 when it is later loaded and executed in the computer system 110 (such as in the kernel 130), and can, therefore, be used in version identifying steps of process 400 to determine whether a module in a memory image has the configuration of the executable 200. The numbering shown above the executable sections 210, 220 indicates the location of each byte in the executable 200 and is useful for establishing the offsets of the beginning of each executable segment 240 in the executable 200. In a preferred embodiment, each of the checksum values for the executable 200 is linked and/or identified in part by its offset value.

The indexing process 300 continues at 330 with the calculation of the size of the isolated executable segments 240 such as by performing checksums. Additionally, the total size of the executable 200 is determined at 330 for later use in the identification process 400. For example, the checksum values for the executable segments 240 may be the values as discussed above, and the total size of the executable 200 in the illustrated example of FIG. 2 is 69 bytes.

In one embodiment, implementation specific information from headers (such as Elf or other programming language headers) is recorded by the dump analysis system 150 to assist in calculating the sizes of the isolated executable segments 240 and the executable 200 in step 330. For example, in an Elf-based application of the invention, the Elf sh_flags are used to determine which parts of the implementation specific information to record because this technique is used by common loader devices (such as Sun Microsystems Solaris™ loaders) when loading executables into memory. Additionally, the determination of segment size may be enhanced by inclusion of implementation specific details or anomalies for accuracy, such as padding used to align segment addresses or locations. For example, in Solaris™ applications, loadable kernel modules typically have extra padding inserted before executable segments to achieve address alignment used by the compiler and for Solaris™-specific purposes. Since the core kernel components often have no such padding, this implementation specific information preferably is recorded by the dump analysis system 150 to allow initial identification based on size during the identification process 400 (as will be discussed in more detail).

The indexing process 300 continues at 340 with the creation of a list of byte sequences for use in matching with similar sequences in memory images from computer system 110. The created list of byte sequences is formed from the isolated segments 240 in each executable 200 from step 320 that identified the sequences of bytes that are not typically affected by kernel relocation and linking processes within the computer system 110. The list is preferably sorted for more effective searching during later identification processes 400. Preferably, the list of byte sequences includes offset information for the starting location of each segment 240 within an executable and also the calculated lengths of each of the segments 240.

At 350, a checksum operation is performed on each of the byte sequences of step 340 (if not performed earlier in step 330) to create a numeric signature of each isolated executable 200. For example, the executable signature of executable 200 would include the listing of checksum labels (i.e., C1–C8) for each byte sequence, an offset associated with each checksum label or byte sequence, and a calculated byte sequence length for each listed checksum label/byte sequence. Once the full executable signature is generated, the original byte sequences, isolated executable files, and other data can be discarded or deleted from memory.

At 360, the executable signatures are stored as a system comparison file for the computer system 110 in the system comparison files 180 by the dump analysis system 150. Other relevant information that may be useful during the identification process 400 or during later dump analysis preferably is stored during step 360 and linked to the executable signature for ready retrieval. For example, this additional information may include executable or module 200 name, package name, version and revision information, and the like.

While the executable signatures (or listings of information for the isolated executables 200) may be stored in numerous file formats to practice the invention, one preferred storage arrangement is as records and files in a database. In this embodiment, the system comparison files 180 is a database storage system with a database management application managing data storage, arrangement, and retrieval. One useful format for the database comprises files with a first word of the file being a "magic" or identifying number, a second word of the file being a version number of the database (which may be useful for indicating when last updated or providing other useful information), and a third word of the file being the index size for the database. The index size is the number of buckets in the database hash table. The database includes database pointers providing an offset into each database file. Each bucket entry is the head of a singly linked list of checksum blocks (i.e., the executable signatures). The bucket entries describe attributes of the immediately following text segment and checksum block.

The checksum blocks further include the above described checksum labels, offsets, and byte sequence lengths for use in the identification process 400. Each checksum block may also be the head of another singly linked list of identification blocks that include information useful for describing the binary or executable 200. A linked list is useful because the same executable 200 may be included in multiple releases or versions of operating system 120, kernel 130, or patch versions. The checksum blocks can be hashed by a selected number, such as the text size (e.g., the calculated size of isolated segments from step 330) divided by a given number. In one embodiment adapted for Sun Microsystems™ applications, the text size is divided by 4 because SPARC (i.e., a Sun Microsystems™ architecture for microprocessors) text segments comprise 4-byte words. In this embodiment, sorting and indexing is based on the text size, with the size of an isolated segment providing a reliable, steady number that does not change during operation of the computer system 110 and provides a useful hashing spread.

In Elf-based applications of the invention, it is important to achieve the proper alignment (i.e., using proper offsets) of the isolated segments for later comparison in the identification process 400. Alignment in Elf-based applications is especially important because in Elf the in-core copies of the text segments are a combination of the text extension sections and various rodata extension sections that are all aligned according to the alignment value in the Elf section header. The kernel 130 also adds a word, of varying size, to the end of a text segment as a hook for the kernel 130 to move the whole text segment under various conditions of the operating system 120.

Although not shown in FIG. 3, the indexing process 300 is preferably repeated at least periodically for each computer system 110 to maintain an up-to-date comparison file of the executables 200 that may be run on computer system 110. As new versions of software and patches become available, the system comparison files 180 may become less useful in accurately identifying versions of software for dump analysis if the indexing process 300 is not repeated. Periodic repeating (e.g., daily, weekly, monthly, quarterly, and the like) of the indexing process 300 can be performed automatically over link 140 by operating the dump analysis system 150. Alternatively, the operator of the dump analysis system 150 may insert (i.e., in a separate indexing process 300, rather then by retrieval of executables 200 from the computer system 110) new software revisions and patches into existing comparison files in the files 180 as such revisions and patches become available (i.e., before or concurrent with loading of such software on the computer system 110). Of course, the entire indexing process 300 may be performed without communication between the dump analysis system 150 and computer system 110 with software for inclusion in created comparison files 180 being separately identified and provided by the operator of the dump analysis system 150.

Figure 4:
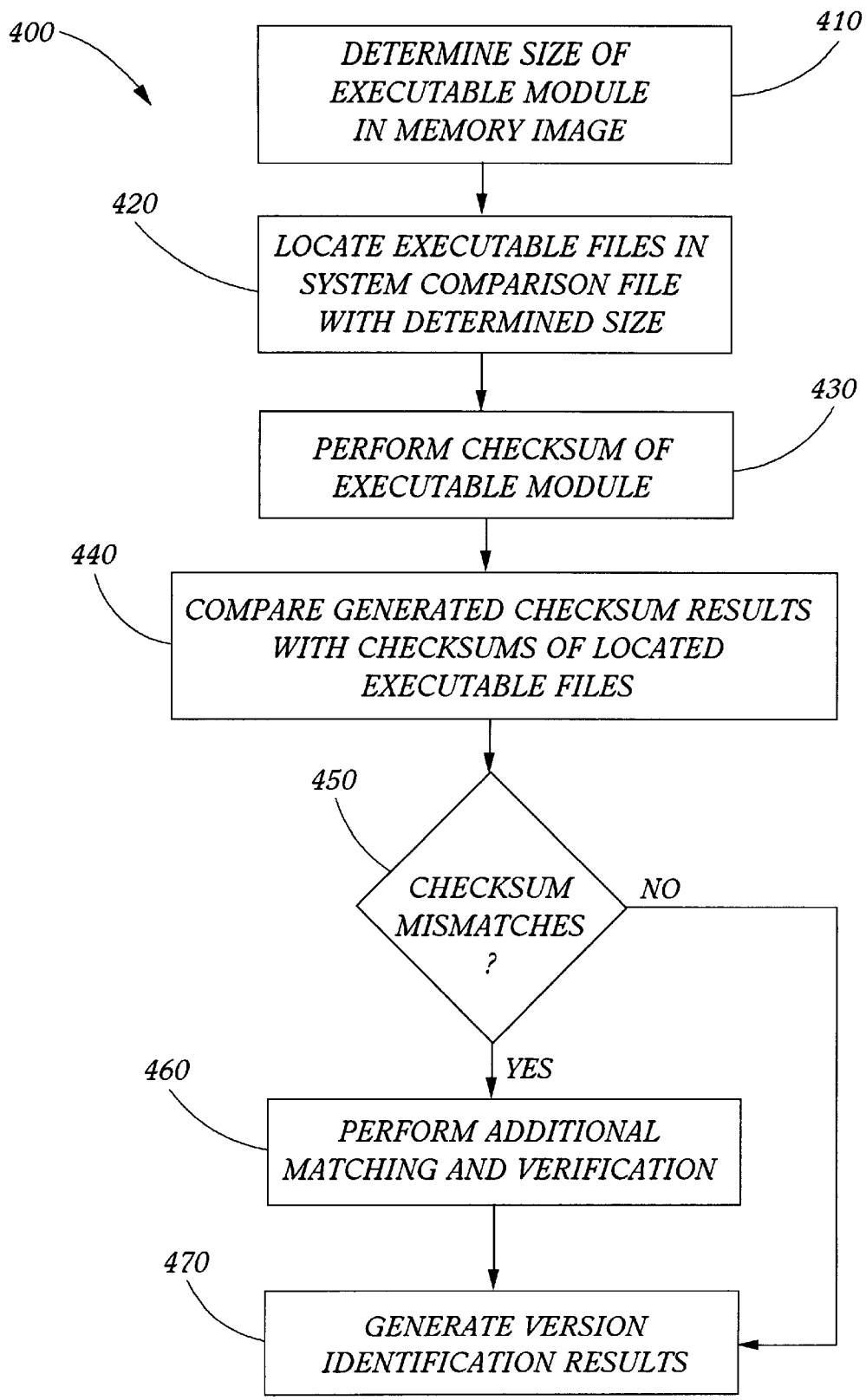
FIG. 4 is a flow diagram showing the operation of the version identification mechanism of the dump analysis system of FIG. 1.

Referring now to FIG. 4, the identification process 400 may be used to identify the versions of software running on the computer system 110 at the time of a crash (or at other operating times) once the indexing process 300 is completed. The identification process 400 is initiated with the receipt at the dump analysis system 150 of a memory image (e.g., a crash memory image) from computer system 110 that is communicated over the link 140 and then stored in the crash memory images 190. Of course, the memory image may also be transferred to the dump analysis system 150 by physical transfer of a memory device (e.g., a disk, CD-ROM, and the like). The dump analysis system 150 may also receive a request for dump analysis or, at least, for identification of the versions of software operating on the computer system 110 at the time of the memory dump.

At 410, the identification process 400 continues with the determination of the size of each executable module 200 in the received memory image. The determination of the total size or length in bytes of the executable modules 200 typically also involves identifying the starting address of each executable 200.

At 420, for each of the executable files in the memory image, the version identification mechanism 170 locates executable files, or, more precisely, executable signatures, in the comparison file associated with the computer system 110 stored in files 180 that have total byte length or size that matches the size of the executables 200 in the memory image. In the above discussed database embodiment of the system comparison files 180, this matching feature is achieved by indexing into the database to find executable signatures (stored in checksum blocks) that match the size of the executable 200 determined in step 410.

At step 430, each of the executables 200 located in step 410 in the received memory image are processed such that for every signature found in step 420 every offset, size, and checksum tuple (representing an individual isolated text segment) is used to create a checksum for the received memory image. Preferably, this checksum is calculated using the exact same algorithm as in step 350. The checksum of the text segment begins at the start of the executable in memory plus the offset from the signature and continues for the number of bytes indicated by the size in the signature.

The identification process 400 continues at 440 with a comparison of the generated checksum results (e.g., the electronic signature) for each executable 240 in the crash memory image with the electronic signatures of files located in step 420 of modules (or their electronic signatures) in the comparison file for the computer system 110 having matching overall byte length. For example, with reference to the executable in FIG. 2, the checksum results for an executable 200 in the memory image with a size of 69 bytes would be compared with each electronic signature of modules in the comparison file that has a size value of 69 bytes. At offset 00, a checksum value of 7 bytes in both the checksum results and the electronic signature would produce a match. At offset 11, a checksum value of 3 bytes in both the checksum results and the electronic signature would produce a match. This process is performed for each segment 240 for each module with a matching electronic signature overall size and the matching (or mismatching) results are stored by the mechanism 170.

At 450, the process 400 continues with determination of whether there were checksum mismatches in the comparison step of 440. If there were no checksum mismatches between a particular electronic signature of an executable 200 and the checksum results of an executable 200 in the memory image, a positive identification has occurred. In this case, at 470, the version identification results are generated, which include the identification of the version of software identified in step 440 as operating on the computer system 110 at the time the memory image was created (such as at the time of a system crash). The generated results preferably include the additional information stored and linked to the electronic signature (such as module name, version and patch information, and the like) that may be useful during dump analysis.

If at 450 it is determined there were mismatches in offset locations and/or segment sizes, the process 400 continues at 460 with additional matching and verification processing. If a positive identification was not achieved, the version identification mechanism 170 may be configured to determine the number of mismatches occurring during the comparison of step 440. A positive match may be established when the number of mismatches is small relative to the overall size of the compared executables 200 (i.e., number of segments 240 with associated offsets and checksum values in the comparison file electronic signature and the executable 200 of the memory image). When a "positive" match of this type is determined, the version identification mechanism 170 preferably is adapted to sort the "positive" matches by the number of mismatches and the results of the comparison is provided as part of the generated results in step 470. Additionally, at step 460, portions of the additional information stored during the indexing process 300, such as the module name, can be compared with similar information associated with the executable 200 in the memory image to verify the correctness of the "positive" match. Although not shown, this type of verification may also be performed as part of the process 400 when no checksum mismatches are noted at step 450 to further verify the identification results.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the invention generally provides an import mechanism that is useful in any text or document processing application to provide modularity and provide an efficient and effective method of generating documents that comprise a plurality of smaller or subdocuments. These component documents can readily be maintained and updated separately.

I claim:

1. A method for identifying software executing on a computer system from a memory image from the computer system defining at a particular time a state of the executing software, the method comprising:

populating a comparison file for the computer system with a plurality of executable signatures, wherein the executable signatures correspond to a plurality of preselected executables executable on the computer system and include version identifying information for the preselected executables;

locating executables in the computer system memory image;

processing the located executables from the memory image to generate comparison information for each of the located executables; and comparing the generated comparison information for the located executables to the version identifying information of the executable signatures to identify the preselected executables executing on the computer system.

2. The method of claim 1, wherein the populating includes generating the version identifying information by isolating executable text segments in each of the preselected executables and determining an offset for the isolated executable text segments.

3. The method of claim 2, wherein the generating the version identifying information includes performing a checksum for each isolated executable text segment to determine the number of bytes in the isolated executable text segments.

4. The method of claim 3, wherein the processing of the located executables includes locating executable text segments in each of the located executables and determining an offset and a checksum for each of the executable text segments for inclusion in the generated comparison information.

5. The method of claim 4, wherein the comparing includes obtaining matching results by matching the offsets in the comparison information with the offsets in the version identifying information and comparing the checksums of the executable text segments at the matched offsets in the comparison information and the version identifying information.

6. The method of claim 5, further including performing additional verification of the matching results by determining whether the matching results comprise fewer mismatches then a mismatch tolerance value and if within the mismatch tolerance value, verifying the identification of the preselected executables executing on the computer system.

7. The method of claim 3, wherein the comparison file includes a length value for each of the preselected executables and the processing of the located executables includes calculating a length value for the located executables, and further wherein the comparing includes first locating executable signatures in the comparison file corresponding to ones of the preselected executables for which the length value matches the calculated length value for at least one of the located executables.

8. A computer program product for identifying software executing on a computer system using a memory image from the computer system, comprising:

first computer code devices configured to cause a computer to locate executable files in the memory image;

second computer code devices configured to cause a computer to process the located executable files to generate comparison information for each of the located executables including a size value;

third computer code devices configured to cause a computer to locate in a comparison file executable signatures associated with select ones of preselected executables executable on the computer system having a matching size value; and fourth computer code devices configured to cause a computer to compare the comparison information for the located executable files with version identifying information included in the executable signatures having matching size values.

9. The computer program product of claim 8, wherein version identifying information comprises size and offset information for executable segments in executables and wherein the comparison information includes size and offset information for executable segments in the located executable files.

10. The computer program of claim 9, wherein the comparing by the fourth computer code devices includes matching the offset information and at each matched offset comparing the size information for the executable segments of the located executable files and the executable signature.

11. A software identification system for identifying software executing on a computer system using a generated memory image defining a state of the executing software on the computer system, comprising:

an indexing mechanism adapted for processing a plurality of executable files executable on the computers system to create a listing of byte sequences representing the executable files, wherein the listing of byte sequences includes a size value for each of the byte sequences and an offset value and a length value for executable text segments in each of the byte sequences; and an identification mechanism adapted for processing the memory image to locate executables, to determine a size value for each of the located executables, and to identify for each of the located executables the byte sequences for which the byte sequence size value matches the determined size value.

12. The system of claim 11, wherein the identification mechanism is further adapted to isolate executable text segments in the located executables and to determine an offset value and a length value for each of the isolated executable text segments.

13. The system of claim 12, wherein the identification mechanism is operable to compare for each of the identified byte sequences the offset and length values of the identified byte sequences with the offset and length values determined for the located executables and based on the comparison, determining whether a positive identification of located executables is achieved for the computer system by comparing a checksum value determined for the located executables and the executable text segments in the indexed byte sequences.

14. A method for identifying executables running at a particular time in a computer system, comprising:

generating a comparison file comprising signature data for a set of executables executable on the computer system, the signature data being indexed on a total length parameter calculated for each of the executables;

receiving a memory image defining a state of the executables running on the computer system at the particular time;

calculating a total length value for each of the executables in the memory image; and indexing into the comparison file with the calculated total length values to locate a set of the executables in the comparison file for each of the executables in the memory image with a matching total length parameter.

15. The method of claim 14, wherein the generating includes isolating executable text segments in the executables and determining an offset and a checksum of each of the executable text segments, the offsets and checksums being recorded in the signature data.

16. The method of claim 15, further including isolating executable text segments in the executables in the memory image and determining an offset and a checksum of each of the executable text segments and after the indexing, comparing the offset and the checksum in the signature data for each of the executables in the matched set with the offset and the checksum determined for the corresponding executable from the memory image having the matching total length parameter.

17. The method of claim 16, further including determining a number of offset or checksum mismatches occurring during the offset and checksum comparing and based on a comparison of the determined number of mismatches with a mismatch tolerance, generating a positive identification listing of the executables in the comparison file.

* * * * *

UNITED STATES PATENT AND TRADEMARK OFFICE
CERTIFICATE OF CORRECTION

PATENT NO. : 6,738,932 B1
DATED : May 18, 2004
INVENTOR(S) : Greg A. Price

It is certified that error appears in the above-identified patent and that said Letters Patent is hereby corrected as shown below:

<u>Column 11,</u>
Line 51, "computers" should be -- computer --

Signed and Sealed this

Thirteenth Day of July, 2004

JON W. DUDAS
*Acting Director of the United States Patent and Trademark Office*